(Model.)
J. K. CUMMINGS.
COFFEE POT.
No. 247,890.     Patented Oct. 4, 1881.
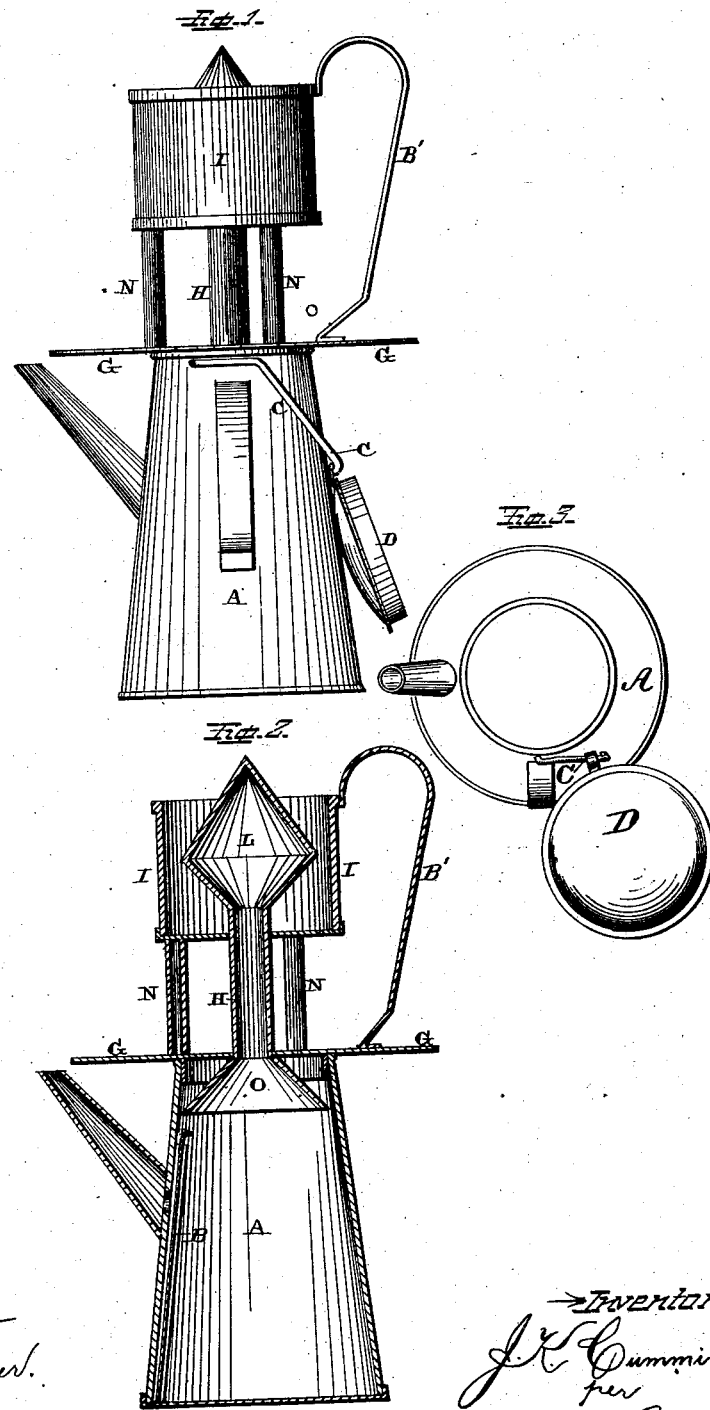
Witnesses
W. W. Mortimer.
C. H. Isham.
Inventor
J. K. Cummings,
per
F. A. Lehmann,
Att'y

UNITED STATES PATENT OFFICE.

JAMES K. CUMMINGS, OF LADONIA, TEXAS.

COFFEE-POT.

SPECIFICATION forming part of Letters Patent No. 247,890, dated October 4, 1881.

Application filed July 6, 1881. (Model.)

*To all whom it may concern:*

Be it known that I, JAMES K. CUMMINGS, of Ladonia, in the county of Fannin and State of Texas, have invented certain new and useful Improvements in Coffee-Pots; and I do hereby declare the following to be a full, clear, and exact description of the invention, such as will enable others skilled in the art to which it pertains to make and use it, reference being had to the accompanying drawings, which form part of this specification.

My invention relates to an improvement in coffee-pots; and it consists in securing a wire diagonally down the side of the pot, and to which wire is attached the cover of the pot in such a manner that the cover can be dropped down out of the way when the condenser is put on without detaching the cover from the pot.

Figure 1 is a side elevation of my invention. Fig. 2 is a vertical section of the same. Fig. 3 is a plan view of the coffee-pot alone, showing the manner of attaching the cover.

A represents an ordinary coffee-pot, which has the lower end of its spout closed by means of a slide, B. This slide moves vertically in suitable guides which are formed on the inside of the pot, and serve to prevent the escape of the aroma and steam from the coffee.

Secured to the outside of the pot, and extending diagonally down and around its side, is a wire, C, to which the cover D is loosely attached. This cover is attached in this manner so that when it is desired to apply the condenser to the top of the pot the cover can be turned back and moved out of the way without separating the cover from the pot. By means of this wire the cover is prevented from being detached from the coffee-pot, and thus all danger of its being misplaced or lost is entirely avoided.

When the cover is turned back the condenser is applied to the top of the coffee-pot, and at the same time the slide is moved so as to close the spout. This condenser consists of the base-plate or cover G, tube H, water-vessel I, and a smaller condensing-vessel, L, which is attached to the top of the tube and placed inside of the water-vessel. This cover has a suitable flange projecting down from its under side so as to fit tightly inside the top of the pot and make a tight joint. Secured to the lower end of this tube H is a funnel-shaped deflector, O, which is just large enough to go readily inside the top of the pot, and which is designed to catch the vapor and aroma and start them upward into the tube.

The water-vessel I may be of any suitable size, and is supported upon the top of the tube by any desired number of supports, N, and secured to this base-plate or cover G and this water-vessel is a suitable handle, B', by means of which the whole condensing apparatus can be removed and replaced at will. The condenser, which is secured to the upper end of the tube and placed inside of the water-vessel, is made of the double-cone shape shown, or any other form that may be preferred, and into which the steam and aroma from the coffee rise. This condensing-vessel being kept constantly cool by contact with water, the steam and aroma are at once condensed and drop back into the coffee. Where the steam and aroma from the coffee are not allowed to escape, but are at once condensed and returned to the coffee, a pleasant and delicate flavor is imparted to the coffee, and the coffee is made more palatable than where the steam and aroma are allowed to escape.

Having thus described my invention, I claim—

1. The combination of the coffee-pot A, cover G, provided with a flange to fit inside of the top of the pot, and having a condensing apparatus placed upon its top, with a wire, C, applied diagonally to the side of the pot, and a cover, D, loosely applied to the wire, whereby, when the condensing apparatus is in use, the cover D can be swung back out of the way, substantially as shown.

2. The combination, with a coffee-pot, of a wire, C, that is secured diagonally to the side, and the cover D, which is secured to the wire, substantially as shown and described.

In testimony that I claim the foregoing I have hereunto set my hand this 18th day of August, 1880.

JAMES K. CUMMINGS.

Witnesses:
G. A. CARPENTER,
G. W. B. LARRISON.